Sept. 11, 1973  A. BALLESTRAZZI ET AL  3,758,366
DEVICE FOR WELDING AND CUTTING FILMS OF PLASTICS
MATERIALS IN APPARATUS FOR PACKING GOODS
Filed Feb. 26, 1970

United States Patent Office 3,758,366
Patented Sept. 11, 1973

3,758,366
DEVICE FOR WELDING AND CUTTING FILMS OF PLASTICS MATERIALS IN APPARATUS FOR PACKING GOODS
Aris Ballestrazzi, Via Plessi 19; Lamberto Tassi, Via G. di Vittorio 60; and Gianni Tosarelli, Via 1° Maggio 217, all of Vignola (Modena) Italy
Filed Feb. 26, 1970, Ser. No. 14,585
Claims priority application Italy, Feb. 26, 1969, 13,375/69, Patent 858,011
Int. Cl. B32b 31/18
U.S. Cl. 156—515
2 Claims

ABSTRACT OF THE DISCLOSURE

A device for welding and severing a film of plastics materials as used in wrapping articles is disclosed, which permits that the welding and severing operations be satisfactorily carried out in spite of the fact that the plastics material film is moved continuously on and by a conveyor belt or a similar conveyance mechanism. The improvement consists essentially in that the carriage which supports the welding tools proper is guided on fixed horizontal ways, the reciprocation stroke of the carriage being adjustable, the carriage having also vertical guides to limit the motion of the welding rod.

---

This invention relates to apparatus for the automatic packing of goods within a film of plastics materials and relates more particularly to a device for welding and severing the individual packs. As is known, these apparatus provide to wrap the goods to be packed with a film of a plastics material which is paid out from a spool and onto which the goods are fed at regular intervals. The film is forwarded on a work plane along which means are provided to fold the film and wrap it about the goods. A welding and severing device provides to sealing and separating the individual packs.

If the film with the goods is fed continuously, the welding and severing device must, of necessity, be so constructed as to be able to effect the welding and severing operations on the moving film.

A number of systems are known to effect this operation, but they are impaired by several defects.

One of these systems provides for a welding rod which is brought at the periphery of a roller rotatble about its own axis, a second roller acting as a counterwelding device. The moving film is passed between the two rollers and is welded and severed at the instant where the welding rod is in front of the second roller. With this system no reliable welding seams are obtained since the time available for welding is exceedingly short.

Another conventional welding device comprises a welding rod integral with two vertical plates, the latter being supported in a cantilever-like fashion by couples of cranks which impart to the plates, and thus also to the welding rod, a rotary motion. To the two vertical plates is connected, by a slot block connection, a carriage mounted so as to effect a horizontal reciprocation, said carriage supporting a counterwelding tool cooperating with the welding rod to perform the welding of the film. The motion of the carriage and of the welding rod is synchronized with the feeding motion of the film. Also this mechanism is unsatisfactory on account of its poor mechanical stability and the too short time available for each welding operation.

An object of the present invention is to provide a welding mechanism which is not affected by the drawbacks of the conventional devices and is capable of carrying out in a reliable and rapid manner the welding and severing of the films of plastics material which are being fed continuously.

This object is achieved according to the invention with a device comprising a carriage with a counterwelding tool and a welding rod, characterized in that the carriage is guided on fixed horizontal ways and is equipped with means capable of imparting thereto a reciprocation of variable amplitude, substantially vertical ways being integral with the carriage to guide the welding rod, the latter, in turn being equipped with actuating means to impart a reciprocal drive to the rod so as to approach the welding rod to the counterwelding tool and to withdraw same therefrom, respectively.

In a preferred embodiment of the welding mechanism according to the invention, the stroke allowed for the welding rod in the ways of the carriage is shorter than the maximum stroke which can be obtained with the relevant actuating means, resilient means being provided to absorb the excess stroke as imparted by said actuating means. The welding device according to the invention affords the advantage of being sturdy and having a considerable mechanical stability, of having a limited vertical excursion for the welding rod and of allowing a longer time for the welding step proper, thus ensuring a higher reliability during progress of welding.

The invention will be described in greater detail hereinafter with reference to the accompanying drawings which are illustrative, by way of example and without limitation, of an embodiment of the subject welding device.

Figure 1:
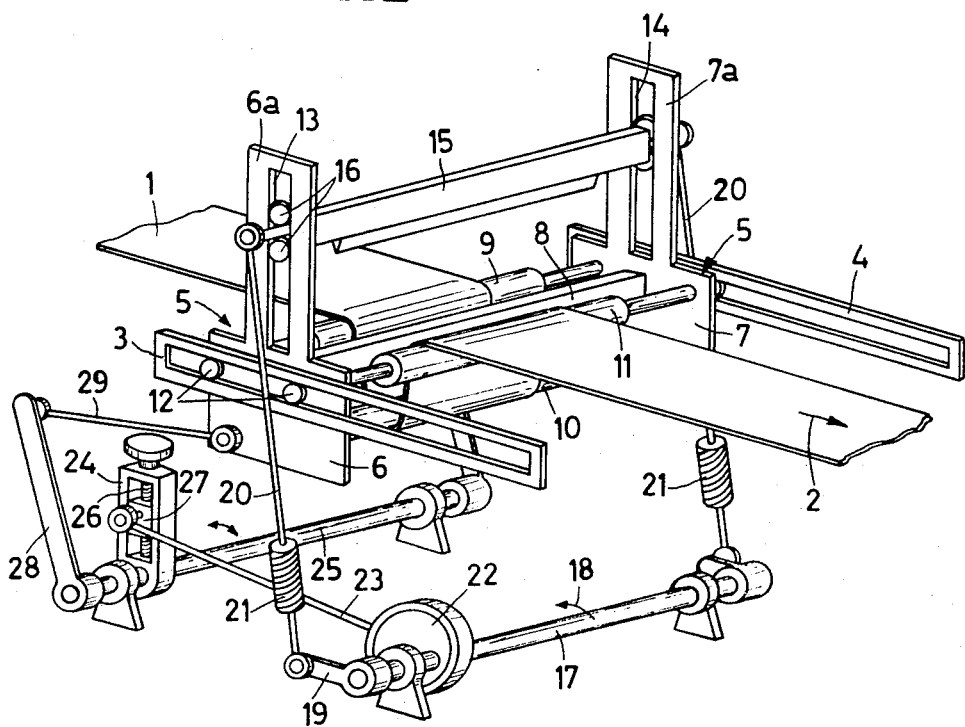
FIG. 1 is a diagrammatical perspective view of the device.

FIG. 1 shows a conveyor belt 1 coming from the packing implementation, and on which the articles are fed at regular spaced intervals, already wrapped by a continuous film of a plastics material. The conveyor belt 1 with the film and the wrapped articles is fed forward continuously in the direction of the arrow 2. At both sides of the conveyor belt, fixed horizontal ways 3 and 4 are provided, between which a carriage, generally shown at 5, is guided. The carriage consists of two side plates 6 and 7 which are mutually connected by a transversal rod 8 which is the counterwelding tool, and three idle rollers 9, 10 and 11 around which the belt 1 runs as clearly shown in FIG. 2. The plates 6 and 7 carry rollers 12 engaged by the guides 3 and 4. Each plate has a vertical extension, 6a and 7a, respectively, equipped with a guiding slot 13, and 14, respectively, for the welding rod 15, the latter engaging said guides by means of rollers 16. The welding rod 15 is made, in quite conventional a manner, with an electrically heated wire.

To control the motions of the carriage 5 and the rod 15, the following means are provided.

A shaft 17 is rotated in the direction of the arrow 18 at a fixed ratio with respect to the feeding speed of the conveyor belt 1. At both ends the shaft 17 carries cranks 19 which are connected by means of rods 20 at the ends of the welding rod 15. In the rods 20, springs such as 21 or similar means, are inserted for allowing a restricted elongation or shortening of the rods.

In addition, the shaft 17 carries an eccentric 22 which is connected by a clevis 23 to a lever 24 affixed to a second shaft 25, the latter being thus driven to oscillate about its own axis. More precisely, the lever 24 carries a lever 26 which passes through a block 27 guided internally of the lever. By turning the screw 26 the block 27 can be shifted so as to bring it towards or away of the shaft 25. Since the clevis 23 is linked to the block 27, it is obvious that, by manipulating the screw 26 the amplitude of oscillation of the shaft 25 can be adjusted and, concurrently, also the stroke of the carriage, the latter being connected to the shaft 25 by two couples of toggle levers 28–29.

The operation of the above described mechanism is as follows.

During the forward stroke of the carriage 5 along the direction of feed of the belt 1 and in attunement therewith, the welding rod 15 is lowered and, at a certain instant, contacts the film conveyed by the belt 1 and, pressing the film against the counterwelding tool 8, the welding and the severing of the film are carried out.

Figure 2:
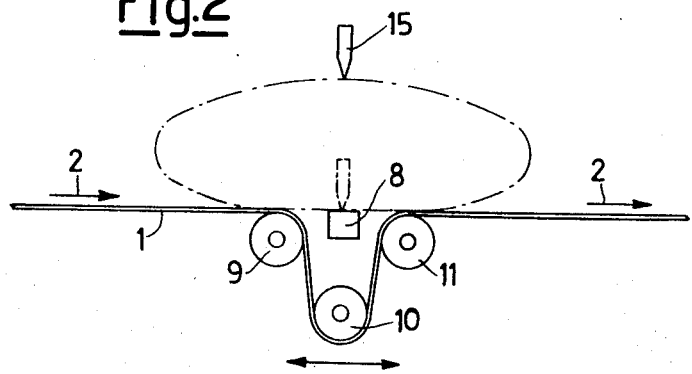
FIG. 2 is a diagram illustrating the motion of the welding rod and the counterwelding tool.

The line along which the welding rod 15 travels is indicated in FIG. 2 in dash and dot lines.

It should be noticed that the lifting stroke of the rod 15 is comparatively short since its lowering is confined by the contact of the rod with the bar 8, whereas the lifting is constricted by the guiding windows 13 and 14. The stroke which can be obtained with the rotary movement of the cranks 19, conversely, is longer than the stroke allowed to the rod 15 and the excess stroke is absorbed by the springs 21. By so doing, the result has been obtained that, during the advance stroke of the carriage 5, the welding rod 15 remains in contact with the counterwelding tool 8 for a reasonably long time so that the satisfactory performance of the welding and severing operations is fully warrented.

The foregoing description makes also clear both the robustness and solidity of the entire mechanism, whose movable component parts are, all of them, quite reliably guided. In addition, it is extremely simple to adjust the stroke of the carriage and thus also the distance between two consecutive welding and severing operations, by merely adjusting, by means of the screw 26, the pivotal points of the clevises on the levers 24.

It is obvious that the constructional details of the device can be varied in a number of ways without departing from the scope of this invention.

What is claimed is:

1. A device for welding and severing films of plastics materials in a mechanism for packing articles, comprising a carriage with a counterwelding tool and a welding rod, a conveyor including a conveyor belt and a drive means therefor for passing said film to and removing the severed sections of said film from said carriage, said carriage being characterized in that the carriage is guided in fixed horizontal ways and is equipped with actuating means separated from said conveyor drive means to impart thereto a reciprocal motion whose amplitude is adjustable, and in that, integrally with the carriage, substantially vertical guides are provided for the welding rod, the latter being fitted, in turn, with actuating means to impart thereto a reciprocation so as to bring the welding rod towards and away with respect to the counterwelding tool, and guide means mounted upon said carriage for separating said film from said conveyor belt and feeding only said film between said welding rod and said counterwelding rod.

2. A device according to claim 1, characterized in that the stroke allowed to the welding rod in the guides of the carriage is shorter than the maximum stroke obtainable with the respective actuating means, resilient means being provided, which are adapted to absorb the excess stroke as imparted by said actuating means.

References Cited
UNITED STATES PATENTS

| | | | |
|---|---|---|---|
| 1,751,451 | 3/1930 | Smith | 156—515 |
| 3,531,359 | 9/1970 | Jones et al. | 156—515 |
| 3,330,716 | 7/1967 | Zelnick | 156—515 |
| 3,413,173 | 11/1968 | Long | 156—515 |

BENJAMIN A. BORCHELT, Primary Examiner

J. V. DORAMUS, Assistant Examiner

U.S. Cl. X.R.

156—510, 523